(12) United States Patent
Awad

(10) Patent No.: US 10,750,428 B2
(45) Date of Patent: Aug. 18, 2020

(54) RELAY COMMUNICATION SYSTEM

(71) Applicant: NEC Corporation, Tokyo (JP)

(72) Inventor: Yassin Aden Awad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 394 days.

(21) Appl. No.: 15/293,763

(22) Filed: Oct. 14, 2016

(65) Prior Publication Data

US 2017/0034764 A1    Feb. 2, 2017

Related U.S. Application Data

(63) Continuation of application No. 13/138,741, filed as application No. PCT/JP2010/057305 on Apr. 19, 2010, now Pat. No. 9,485,006.

(30) Foreign Application Priority Data

Apr. 24, 2009    (GB) .................................. 0907083.0

(51) Int. Cl.
| | |
|---|---|
| H04W 76/11 | (2018.01) |
| H04W 40/22 | (2009.01) |
| H04L 5/00 | (2006.01) |
| H04B 7/155 | (2006.01) |
| H04W 72/04 | (2009.01) |

(52) U.S. Cl.
CPC ........ *H04W 40/22* (2013.01); *H04B 7/15542* (2013.01); *H04L 5/0007* (2013.01); *H04L 5/0032* (2013.01); *H04L 5/0039* (2013.01); *H04L 5/0092* (2013.01); *H04W 72/042* (2013.01); *H04W 72/0446* (2013.01)

(58) Field of Classification Search
CPC ............................ H04W 40/22; H04W 72/042
USPC .......................................................... 370/315
See application file for complete search history.

(56) References Cited

U.S. PATENT DOCUMENTS

| | | | |
|---|---|---|---|
| 7,623,863 B2 | 11/2009 | Chen et al. | |
| 7,751,776 B2 | 7/2010 | Fujita | |
| 7,756,198 B2 | 7/2010 | Chen et al. | |
| 7,885,214 B2 | 2/2011 | Ahmadi et al. | |
| 7,917,149 B2 | 3/2011 | Chen et al. | |
| 8,032,146 B2 | 10/2011 | Zhu et al. | |
| 8,203,966 B2 | 6/2012 | Wang et al. | |
| 8,315,225 B2 * | 11/2012 | Xu .......................... H04L 5/005 370/330 |

(Continued)

FOREIGN PATENT DOCUMENTS

| | | |
|---|---|---|
| CN | 101222746 A | 7/2008 |
| CN | 101299634 A | 11/2008 |

(Continued)

OTHER PUBLICATIONS

Notice of Allowance in U.S. Appl. No. 13/138,741 dated Jun. 21, 2016.

(Continued)

*Primary Examiner* — Samina F Choudhry
(74) *Attorney, Agent, or Firm* — Sughrue Mion, PLLC

(57) ABSTRACT

A method in a relay station includes communicating with a base station, determining if a control signal is included in a subframe, and decoding data in the subframe if the control signal is included in the subframe. The control signal includes a parameter which is related to a quantity of resource blocks.

2 Claims, 8 Drawing Sheets

(56) References Cited

U.S. PATENT DOCUMENTS

| | | | |
|---|---|---|---|
| 2002/0044555 | A1 | 4/2002 | Kamo et al. |
| 2006/0050742 | A1 | 3/2006 | Grandhi |
| 2007/0081502 | A1 | 4/2007 | Lee et al. |
| 2007/0087691 | A1 | 4/2007 | Lee et al. |
| 2007/0201400 | A1 | 8/2007 | Kang et al. |
| 2008/0045174 | A1 | 2/2008 | Chen et al. |
| 2008/0186899 | A1 | 8/2008 | Zhu et al. |
| 2008/0186950 | A1 | 8/2008 | Zhu et al. |
| 2008/0188231 | A1 | 8/2008 | Zhu et al. |
| 2009/0097434 | A1 | 4/2009 | Leng et al. |
| 2010/0040001 | A1 | 2/2010 | Montojo et al. |
| 2010/0115358 | A1* | 5/2010 | Kotecha ............. H04L 1/1812 714/748 |
| 2010/0214972 | A1* | 8/2010 | Che ................. H04W 72/0426 370/315 |
| 2010/0238823 | A1 | 9/2010 | Chen et al. |
| 2010/0246475 | A1 | 9/2010 | Naden et al. |
| 2010/0281323 | A1* | 11/2010 | Wang ............... H04B 7/15507 714/748 |

FOREIGN PATENT DOCUMENTS

| | | |
|---|---|---|
| EP | 1890440 A2 | 2/2008 |
| EP | 1916782 A1 | 4/2008 |
| EP | 2017974 A1 | 1/2009 |
| WO | WO 2008/021721 A2 | 2/2008 |
| WO | WO 2008/021724 A2 | 2/2008 |
| WO | WO 2008/034349 A1 | 3/2008 |
| WO | WO 2008/049028 A1 | 4/2008 |
| WO | WO 2008/078968 A1 | 7/2008 |
| WO | WO 2009/041779 A1 | 4/2009 |

OTHER PUBLICATIONS

Office Action in U.S. Appl. No. 13/138,741 dated Dec. 29, 2015.
Office Action in U.S. Appl. No. 13/138,741 dated Sep. 17, 2015.
Office Action in U.S. Appl. No. 13/138,741 dated Feb. 25, 2015.
Office Action in U.S. Appl. No. 13/138,741 dated Jul. 30, 2014.
Office Acton in U.S. Appl. No. 13/138,741 dated May 20, 2014.
Chinese Office Action dated Oct. 9, 2013.
Japanese Office Action dated Jul. 31, 2013.
Nortel, Supporting relay for Rel-8 UE in downlink, 3GPP TSG-RAN1 Meeting #55 R1-084460, Nov. 14, 2008, p. 1-p. 6, U R L , http://www.3gpp.org/ftp/tsg_ran/WG1_RL1/TSGR1_55/Docs/R1-084460.zip.
Nortel; Discussion paper on the control channel and data channel optimization for relay link, 3GPP TSG-RAN Working Group 1 Meeting #56bis R1-091384, Mar. 27, 2009, p. 1-p. 9, U R L , http://www.3gpp.org/ftp/tsg_ran/WG1_RL1/TSGR1_56b/Docs/R1-091384.zip.
ZTE, Control Channel Structure and Mapping Pattern of Backhaul Link, 3GPP TSG-RAN WG1 #56bis R1-091424, Mar. 27, 2009, p. 1-p. 7, U R L , http://www.3gpp.org/ftp/tsg_ran/WG1_RL1/TSGR1_56b/Docs/R1-091424.zip.
NEC Group, Control Structure for Relay Type 1 nodes, 3GPP TSG-RAN WG1#57Bis R1-092451, Jul. 3, 2009, p. 1-p. 5, U R L , http://www.3gpp.org/ftp/tsg_ran/WG1_RL1/TSGR1_57b/Docs/R1-092451.zip.
R1-084054, "Support of Rel-8 UEs by LTE-A relays", Qualcomm Europe, Sep. 29-Oct. 3, 2008, pp. 1-18.
R1-090153, "Control Channel and Data Channel Design for Relay Link in LTE-Advanced", Nortel Networks, Jan. 12-16, 2009, pp. 1-17.
R1-090331, "Frame Structure and Signaling to Support Relay Operation", Motorola, Jan. 12-16, 2009.
R1-090877, "Specification Impact of L3 Relays", Qualcomm Europe, Feb. 9-13, 2009, pp. 1-3.
3GPP TR 36.814 V1.0.0, $3^{rd}$ Generation Partnership Project; Technical Specification Group Radio Access Network; Further Advancements for E-UTRA Physical Layer Aspects, Release 9, Feb. 2009, pp. 1-31.
3GPP TS 36.211 V8.6.0, $3^{rd}$ Generation Partnership Project; Technical Specification Group Radio Access Network; Evolved Universal Terrestrial Radio Access (E-UTRA); Physical Channels and Modulation, Release 8, Mar. 2009, pp. 1-83.
3GPP TS 36.212 V8.6.0, $3^{rd}$ Generation Partnership Project; Technical Specification Group Radio Access Network; Evolved Universal Terrestrial Radio Access (E-UTRA); Multiplexing and channel coding, Release 8, Mar. 2009, pp. 1-59.
3GPP TS 36.213 V8.6.0, $3^{rd}$ Generation Partnership Project; Technical Specification Group Radio Access Network; Evolved Universal Terrestrial Radio Access (E-UTRA); Physical layer procedures, Release 8, Mar. 2009, pp. 1-77.
A Non-Final Office Action dated May 30, 2019, which issued during the prosecution of U.S. Appl. No. 16/038,708.

* cited by examiner

RELAY COMMUNICATION SYSTEM

The present application is a Continuation Application of U.S. patent application Ser. No. 13/138,741, filed on Sep. 23, 2011, which is based on International Application No. PCT/JP2010/057305, filed on Apr. 19, 2010, which is based on the United Kingdom Patent Application No. 0907083.0, filed on Apr. 24, 2009, the entire contents of which are incorporated herein by reference.

TECHNICAL FIELD

The present invention relates to a communication system and to components thereof for providing relay services to mobile or fixed communication devices. The invention has particular but not exclusive relevance to relay services used in LTE-Advanced as currently defined in 3GPP standards documentation TR 36.814 V1.0.0.

BACKGROUND ART

Relaying is considered for LTE-Advanced as a tool to improve, for example, the coverage of high data rates for User Equipment (UE), group mobility, temporary network deployment, the cell edge throughput and/or to provide coverage in new cell areas. The relay node is wirelessly connected to the radio-access network via a donor cell. The connection can be:

- inband, in which case the network-to-relay link shares the same frequency band with direct network-to-UE links within the donor cell. Rel-8 UEs (see 3GPP specifications TS 36.211 V8.6.0, TS 36.212 V8.6.0 and TS 36.213 V8.6.0) should be able to connect to the donor cell in this case.
- outband, in which case the network-to-relay link does not operate in the same frequency band as direct network-to-UE links within the donor cell.

A Type 1 relay is an inband relay that controls cells of its own. The relay controls one or several cells and a unique physical-layer cell identity is provided in each of the cells controlled by the relay. The same RRM (Radio Resource Management) mechanisms are available and from a UE perspective there is no difference in accessing cells controlled by a relay and cells controlled by a "normal" eNodeB (LTE base station). The cells controlled by the relay should support also LTE Rel-8 (legacy) UEs.

For inband relaying, the eNodeB-to-relay link operates in the same frequency spectrum as the relay-to-UE link Due to the relay transmitter causing interference to its own receiver, simultaneous eNodeB-to-relay and relay-to-UE transmissions on the same frequency resource may not be feasible unless sufficient isolation of the outgoing and incoming signals is provided e.g. by means of specific, well separated and well isolated antenna structures. Similarly, at the relay it may not be possible to receive UE transmissions simultaneously with the relay transmitting to the eNodeB.

One possibility to handle the interference problem is to operate the relay such that the relay is not transmitting to UEs when it is supposed to receive data from the donor eNodeB, i.e. to create "gaps" in the relay-to-UE transmission. These "gaps" during which UEs (including Rel-8 UEs) are not supposed to expect any relay transmission can be created by configuring MBSFN (Multi-media Broadcast over a Single Frequency Network) sub-frames. Similarly, Relay-to-eNodeB transmissions can be facilitated by not allowing any UE-to-relay transmissions in some sub-frames. However, the use of the MBSFN sub-frame introduces some design restrictions for the relay control structure as the relay can not read the PDCCH (Physical Downlink Control Channel) of the donor cell. Hence a new control channel must be designed solely for relay stations.

DISCLOSURE OF THE INVENTION

According to one aspect, the present invention provides a relay station operable to relay data received from a remote station to one or more communications devices, the relay station comprising a communications controller operable: i) to generate a sub-frame comprising an initial part including control data and a subsequent part without data; ii) to control a transceiver so that the transceiver transmits the control data in the initial part of the sub-frame and then switches to a receive mode to receive at least part of a sub-frame transmitted by the remote station; iii) to recover relay control data from the received part of the sub-frame; wherein the relay station is operable to receive data identifying a number of communications resources used to carry the relay control data and wherein the communications controller is operable to use the received data identifying the number of communications resources to locate and recover the relay control data from the received part of the sub-frame transmitted from the remote station. In this way, the remote station can dynamically or statically vary the resources used to transmit the relay control data depending on, for example, the number of relay stations scheduled to receive data in that sub-frame and/or the channel conditions between the relay station and the remote station.

The relay station can be synchronized with the remote station so that sub-frames transmitted by the relay station and the remote station begin at the same time and end at the same time.

The relay station may receive the data identifying the number of communications resources used to carry the relay control data prior to receiving the part of the sub-frame or it may be included in the received part of the sub-frame.

The sub-frame transmitted by the remote station may include at least a first portion of relay control data on predetermined communications resources, which first portion includes data identifying if further relay control data is included on other communications resources and wherein the communications controller may process the first portion of the relay control data to identify if the sub-frame includes such further relay control data and if so, to locate and recover the further relay control data.

The relay control data may be distributed over a number of communication resources and the communications controller may use a predefined equation to identify the resources on which the relay control data is carried. The predefined equation may relate virtual resource blocks to physical resource blocks to identify the resources on which the relay control data is carried and may rely on a cell ID of the remote station to identify a starting virtual resource block.

In one exemplary embodiment, the communications controller uses the following equation:

$$RB_{index}(i) = (N_{ID}^{Cell} \mod N_{RB\_max}^{Alloc} + (i \mod 2) * \lceil N_{RB}^{DL}/2 \rceil) \mod N_{RB}^{DL} \cdot 6 + \lfloor i/2 \rfloor * \lfloor N_{RB}^{DL}/N_{RB\_max}^{Alloc} \rfloor;$$

Where:
$i = 0, 1,$ to $N_{RB\_max}^{Alloc} - 1$
$N_{ID}^{Cell}$ is the cell ID
$N_{RB}^{DL}$ is the downlink system bandwidth in terms of the number of resource blocks (RBs)

$N_{RB\_max}^{Alloc}$ is the total number of RBs that will be allocated for the relay control data ⌊ ⌋ is the floor function defining the smallest integer not greater than the expression inside the brackets ⌈ ⌉ is the ceiling function defining the smallest integer not less than the expression inside the brackets.

One or more default communications resources may be used to carry at least some of the relay control data and wherein the default communications resources used depends on an identity of the remote station that transmitted the sub-frame.

The communications resources that are used may include time domain resources and frequency domain resources.

The present invention also provides a communications station comprising: a communications controller operable to generate a sub-frame comprising an initial part including control data and a subsequent part including user data for devices served by the communications station and operable to specify communications resources to use to carry the sub-frame; and a transceiver operable to use the specified communications resources to transmit the generated sub-frame for receipt by the devices served by communications station; wherein the communications controller is operable to include relay control data, for one or more relay stations served by the communications station, within the subsequent part of the generated sub-frame; wherein the communications controller is operable to vary the number of communications resources specified to carry the relay control data in the subsequent part of the sub-frame; and wherein the communications station is operable to transmit data to the one or more relay stations identifying the number of communications resources used to carry the relay control data.

The present invention also provides a relay station operable to relay data received from a remote station to one or more communications devices, the relay station comprising: a transceiver circuit operable for transmitting signals to and for receiving signals from the remote station and one or more communication devices; a communications controller operable: i) to generate a first type of sub-frame comprising an initial part including control data and a subsequent part including user data for devices being served by the relay station; ii) to generate a second type of sub-frame comprising an initial part including control data and a subsequent part without user data; iii) to control said transceiver: so that for said first type of sub-frame, the transceiver transmits the control data during the initial part of the sub-frame and transmits the user data during the subsequent part of the sub-frame; and so that for the second type of sub-frame, the transceiver transmits the control data and then switches to a receive mode to receive part of a sub-frame transmitted by the remote station; to recover relay control data from the received part of the sub-frame transmitted from the remote station; to determine from the recovered relay control data if the received part of the sub-frame also includes user data for the relay station or for any of the devices being served by the relay station and to recover such user data if included; wherein the relay station is operable to receive data from the remote station identifying the number of communications resources used to carry said relay control data and wherein said communications controller is operable to use the received data identifying the number of communications resources to locate and recover the relay control data from the received part of the sub-frame transmitted from the remote station.

The invention also provides corresponding methods and computer software products that may be provided on a carrier signal or on a recording medium.

BRIEF DESCRIPTION OF THE DRAWINGS

These and other features and aspects of the invention will be apparent from the following exemplary embodiments of the invention which are described by way of example only with reference to the attached figures in which.

BEST MODE FOR CARRYING OUT THE INVENTION

Overview

Figure 1:
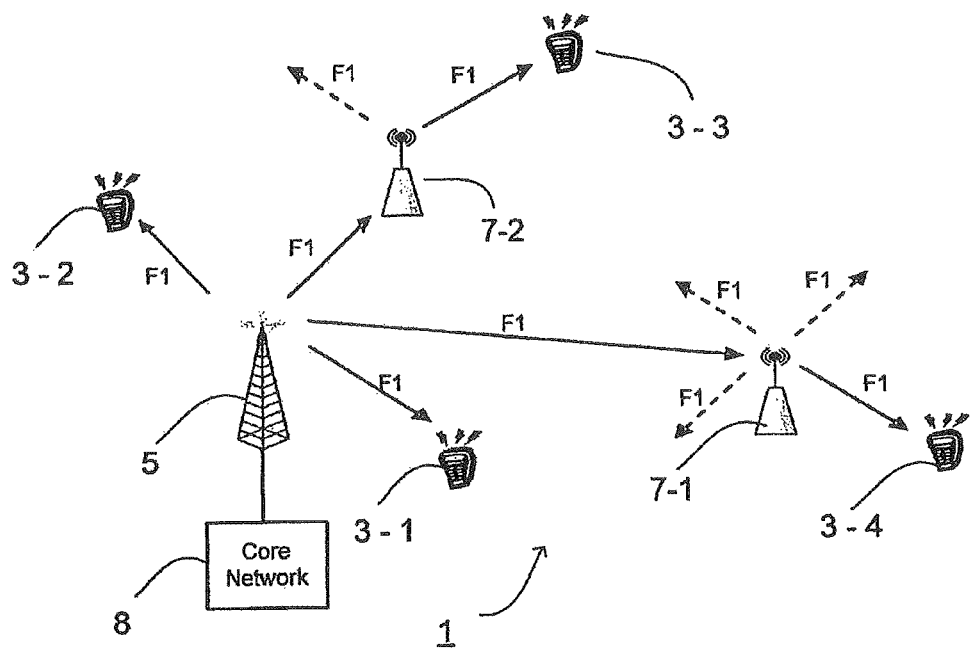
FIG. 1 schematically illustrates a mobile telecommunication system of a type to which the described exemplary embodiments are applicable.

FIG. 1 schematically illustrates a mobile (cellular) telecommunication system 1 in which users of mobile telephones 3-1, 3-2, 3-3 and 3-4 can communicate with other users (not shown) via a base station 5 or relay stations 7-1 and 7-2 and a telephone network 8. As shown in FIG. 1, the base station 5 is directly connected to the core network 8 and so mobile telephones 3-1 and 3-2 directly connected with the base station 5 (hereafter referred to as Direct MTs) communicate in the normal fashion. However, the relay stations 7 are only connected to the core network 8 via the base station 5. Therefore, communications to or from mobile telephones 3-3 and 3-4 that are connected to a relay station 7 (hereafter referred to as Relay MTs) must be transmitted over the air interface between them and the relay station 7 and over the air interface between the relay station 7 and the base station 5. As illustrated in FIG. 1 (by use of the label $F_1$), in this exemplary embodiment, the base station 5 and the relay stations 7 transmit downlink data in the same frequency band. In order to avoid interference, the relay stations 7 do not receive data from the base station 5 when they are transmitting data to the Relay MTs 3 that they are serving. (Similarly, in the uplink the relay stations 7 do not transmit data to the base station 5 at the same time that they receive data from the Relay MTs 3 that they are serving.)

As will be described in more detail below, the present exemplary embodiment describes a number of different ways that control data for the relay stations 7 can be signalled from the base station 5 to the relay stations 7, whilst maintaining the general sub-frame structure agreed for LTE Rel 8.

LTE Sub-Frame Data Structure

Before discussing the specific ways in which control data for the relay station 7 is transmitted from the base station 5, a description will be given of the access scheme and a general frame structure agreed for LTE Rel 8. An Orthogonal Frequency Division Multiple Access (OFDMA) technique is used for the downlink to allow the Direct MTs (3-1 and 3-2) and the relay station 7 to receive data over the air interface with the base station 5 and to allow the Relay MTs (3-3 and 3-4) to receive data over the air interface with the relay station 7. Different sub-carriers are allocated by the base station 5 (for a predetermined amount of time) to each Direct MT 3 and the relay station 7 depending on the amount of data to be sent to the mobile telephone 3 or the relay station 7. These are referred to as physical resource blocks (PRBs) in the LTE specifications. PRBs thus have a time and frequency dimension. Similarly, different subcarriers are allocated by the relay station 7 (for a predetermined amount of time) to each Relay MT, depending on the amount of data to be sent to the Relay MT. To do this, the base station 5 (and the relay station 7) dynamically allocates PRBs for each device that it is serving and signals the allocations for each sub-frame (TTI) to each of the scheduled devices in a control channel.

Figure 2A:
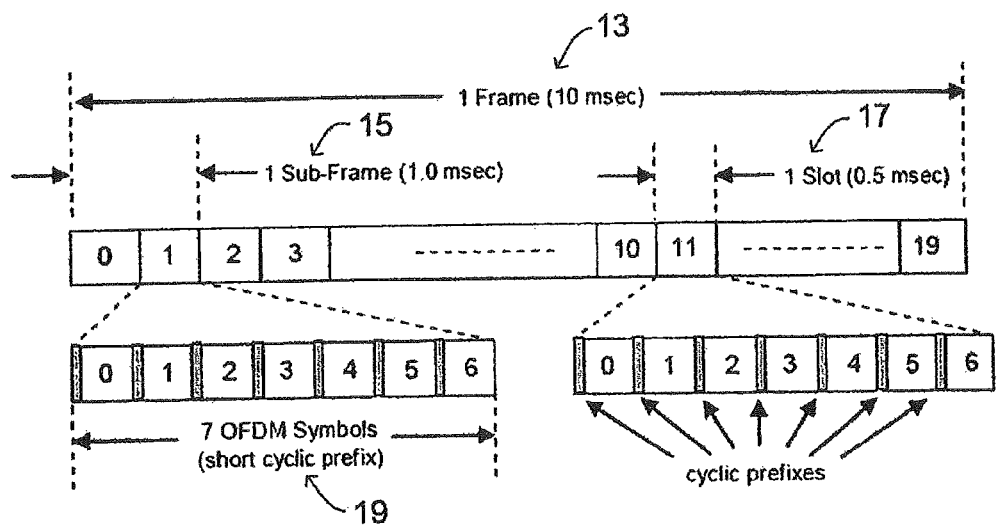
FIG. 2a schematically illustrates a generic frame structure used in communications over the wireless links of the system shown in FIG. 1.
Figure 2B:
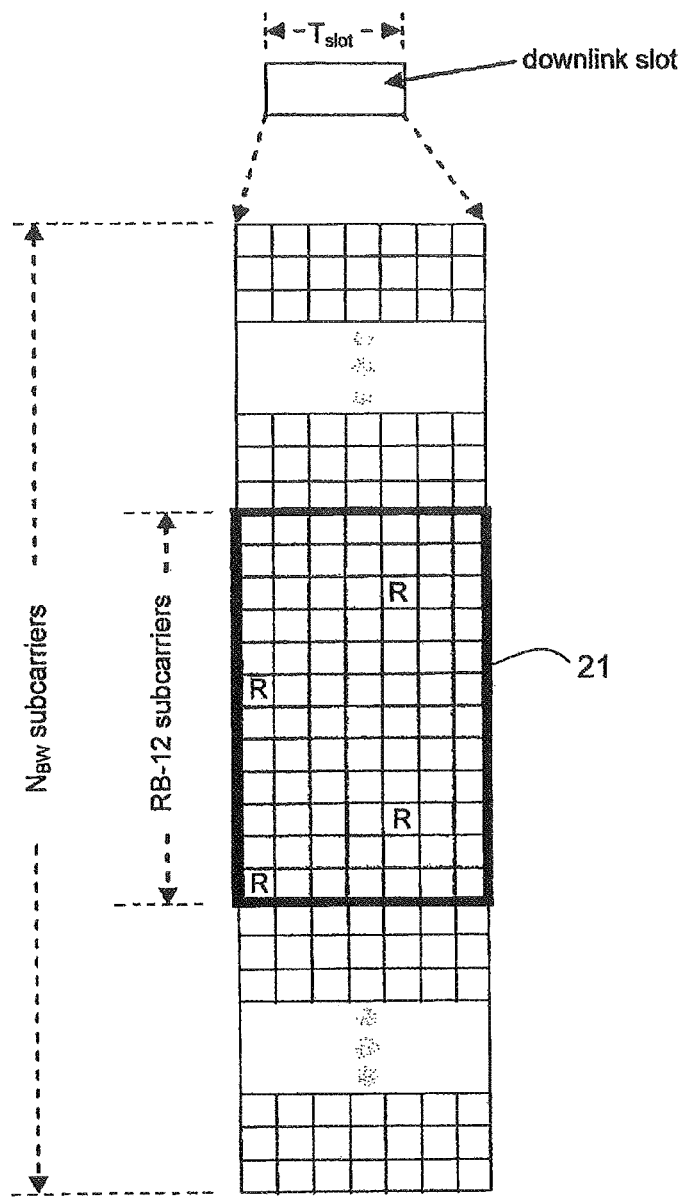
FIG. 2b schematically illustrates the way in which the frequency subcarriers are divided into resource blocks and the way that a time slot is divided into a number of OFDM symbols.

FIG. 2a illustrates a generic frame structure agreed for LTE Rel 8 communications over the air interface with the base station 5. As shown, one frame 13 is 10 msec long and comprises 10 sub-frames 15 of 1 msec duration (known as a Transmission Time Interval (TTI)). Each sub-frame or TTI comprises two slots 17 of 0.5 msec duration. Each slot 17 comprises either six or seven OFDM symbols 19, depending on whether the normal or extended cyclic prefix (CP) is employed. The total number of available sub-carriers depends on the overall transmission bandwidth of the system. The LTE specifications define parameters for system bandwidths from 1.4 MHz to 20 MHz and one PRB is currently defined to comprise 12 consecutive subcarriers for one slot 17. A PRB over two slots is also defined by the LTE specifications as being the smallest element of resource allocation assigned by the base station scheduler. The transmitted downlink signal comprises NBW subcarriers for a duration of $N_{symb}$ OFDM symbols. It can be represented by a resource grid as illustrated in FIG. 2b. Each box in the grid represents a single sub-carrier for one symbol period and is referred to as a resource element. As shown, each PRB 21 is formed from 12 consecutive sub-carriers and (in this case) seven symbols for each subcarrier; although in practice the same allocations are made in the second slot 17 of each sub-frame 15 as well.

In order to facilitate carrier offset estimation, channel estimation, timing synchronisation etc, reference signals are transmitted (for each base station antenna) every sixth subcarrier during the first and fifth OFDM symbols when the short CP is used and during the first and fourth symbols when the long CP is used. These reference signals are illustrated in FIG. 2b by the letter R in the relevant box.

MBSFN Frame Structure for Relaying

It has already been proposed to use MBSFN sub-frames 15 to support relaying, as these are already defined for multicast channels in LTE Rel 8 and thus provide backwards compatibility. Based on the LTE Rel 8 structure, sub-frames 0, 4, 5, 9 in FDD and 0, 1, 5, 6 in TDD cannot be used for MB SFN sub-frames, but some or all of the remaining sub-frames 15 can be signalled as MBSFN sub-frames 15.

Figure 3:
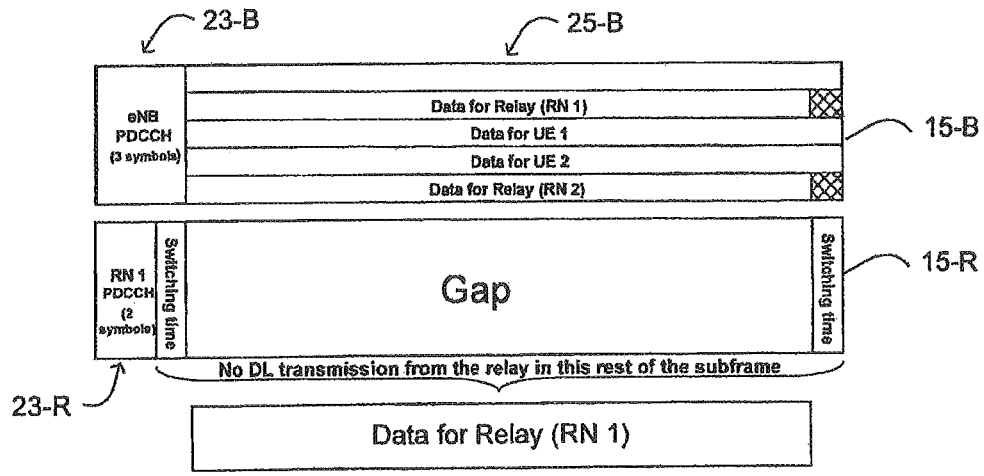
FIG. 3 shows a base station sub-frame and a relay station sub-frame and illustrates a problem caused when the two sub-frames are time synchronised.

FIG. 3 illustrates the MBSFN sub-frame structure 15-B of the base station 5 and the MBSFN sub-frame structure 15-R of the relay station 7 and illustrates the way in which gaps are provided in the relay station's sub-frame structure 15-R to provide appropriate communication opportunities for communications with the base station 5. As illustrated in FIG. 3, in this exemplary embodiment, the base station 5 and the relay station 7 are arranged so that their MBSFN sub-frames are time synchronised. At the start of each base station MBSFN sub-frame 15-B, the base station 5 transmits a PDCCH 23-B (Physical Downlink Control Channel) over the first three symbols. The remaining symbols form the PDSCH 25-B (Physical Downlink Shared CHannel) and are used to carry downlink user data for the Direct MTs 3-1 and 3-2 and for the relay station 7 being served by the base station 5. At the start of a "gap" relay station MBSFN sub-frame 15-R, the relay stations 7 transmit a PDCCH 23-R over the first two symbols before switching to listen and receive data from the base station 5. Relay MTs 3-2 and 3-4 will receive the relay PDCCH 23-R data transmitted over the first two symbols and will see that no data is scheduled for transmission to them in that sub-frame 15 and so will go to sleep until the start of the next sub-frame 15. During this time, the relay stations 7 will receive the downlink data from in the PDSCH 25-B of the base station MBSFN sub-frame 15-B.

Figure 4A:
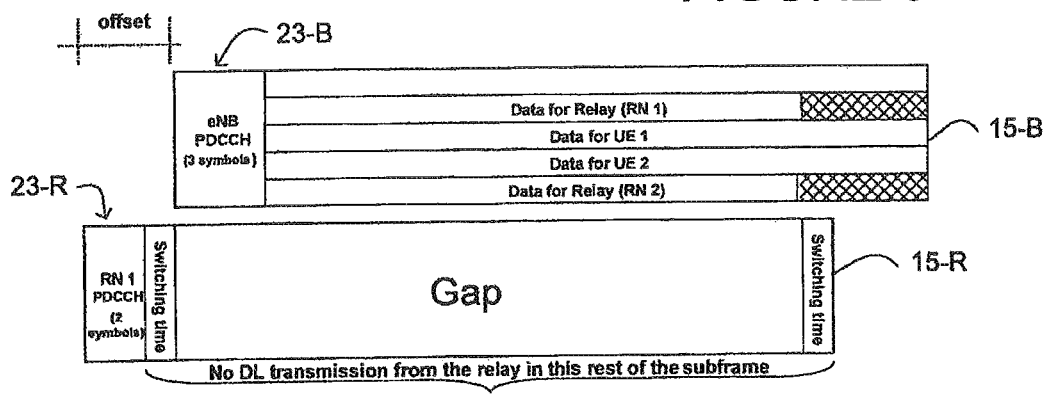
FIG. 4a illustrates one way in which relay nodes can receive PDCCH control data from the base station by introducing a time offset to its sub-frame structure.
Figure 4B:
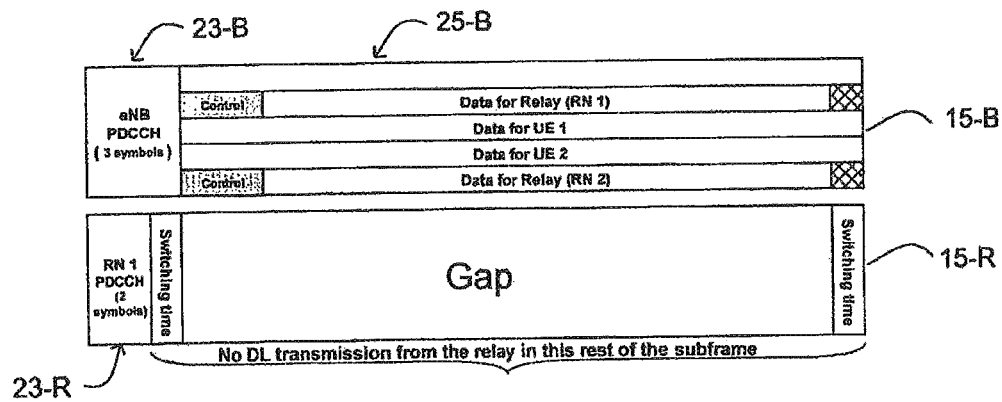
FIG. 4b illustrates a synchronised donor cell and relay cell sub-frame structures used in one exemplary embodiment, and the addition of relay control data for the relay nodes within the user data portion of the donor cell sub-frame.

As those skilled in the art will appreciate, with such synchronisation between the base station 5 and the relay stations 7, the relay stations 7 cannot receive the PDCCH 25-B transmitted by the base station 5—as they are transmitting their own PDDCH control data at the same time. Therefore, the control data for the relay stations 7 has to be included in the PDSCH 25-B portion of the MBSFN sub-frame 15-B transmitted by the base station 5. One alternative technique is to provide an offset between the base station sub-frames 15-B and the relay station sub-frames 15-R, as illustrated in FIG. 4a. However, this offset creates other problems—requiring the relay station 7 to blank some of its own OFDM symbols or to ignore some of the last OFDM symbols transmitted by the Relay MTs. Therefore, the following description will describe how the control data for the relay stations 7 can be embedded within the user data portion (PDSCH 25-B) of the base station sub-frames 15-B (as illustrated in FIG. 4b). One possibility is to define (fix) in advance which resource blocks (RB) will carry the control data for the relay stations. However, this is very inefficient as the resource blocks must be reserved even if they are not needed. The following description will therefore describe two more efficient techniques for designing the control channel: one in which the base station 5 dynamically allocates the resources used for the control channel and one in which the base station 5 uses a semi-static allocation of the resources used for the control channel.

Dynamic Resource Allocation

In the dynamic resource allocations, the base station 5 dynamically allocates the size of the control channel used in the sub-frame 15 and identifies the relay stations 7 to which downlink data has been scheduled in that sub-frame 15. In order to provide for a basic (or minimum) control signaling, in this exemplary embodiment, each MB SFN sub-frame 15 uses two predefined resource blocks that contain a minimum level of control data. This control data can include resource allocation data that identifies other resource blocks in the sub-frame 15 that also contain further control data. In this way the size of the control channel can be dynamically varied between a minimum size and the size required to transmit the control data for the current sub-frame 15. The amount of relay control data that has to be sent in any given sub-frame depends upon the number of relay stations 7 scheduled for receiving data in that sub-frame and the current channel conditions between the base station 5 and the relay station 7.

The control data normally sent by the base station 5 in each sub-frame 5 includes:
1) the Physical Control Format Indicator Channel (PCFICH) which informs the relay stations 7 of the size of the PDCCH in terms of the number of resource blocks in the frequency domain;
2) the PHICH which carries the hybrid-ARQ ACK/NAK data; and
3) the PDCCH which contains all the information required by the receiving device to decode the downlink transmission in the same sub-frame 15 (resource allocation, modulation scheme TB size etc) and data identifying where and how to transmit in the uplink in the next TTI (frame) 13.

In order to differentiate this control data (normally sent at the beginning of the sub-frame 15) from the additional control data (for the relay stations 7) embedded into the PDSCH 25, the labels PRCFICH, PRHICH and PRDCCH will be used to identify the latter.

Figure 5A:
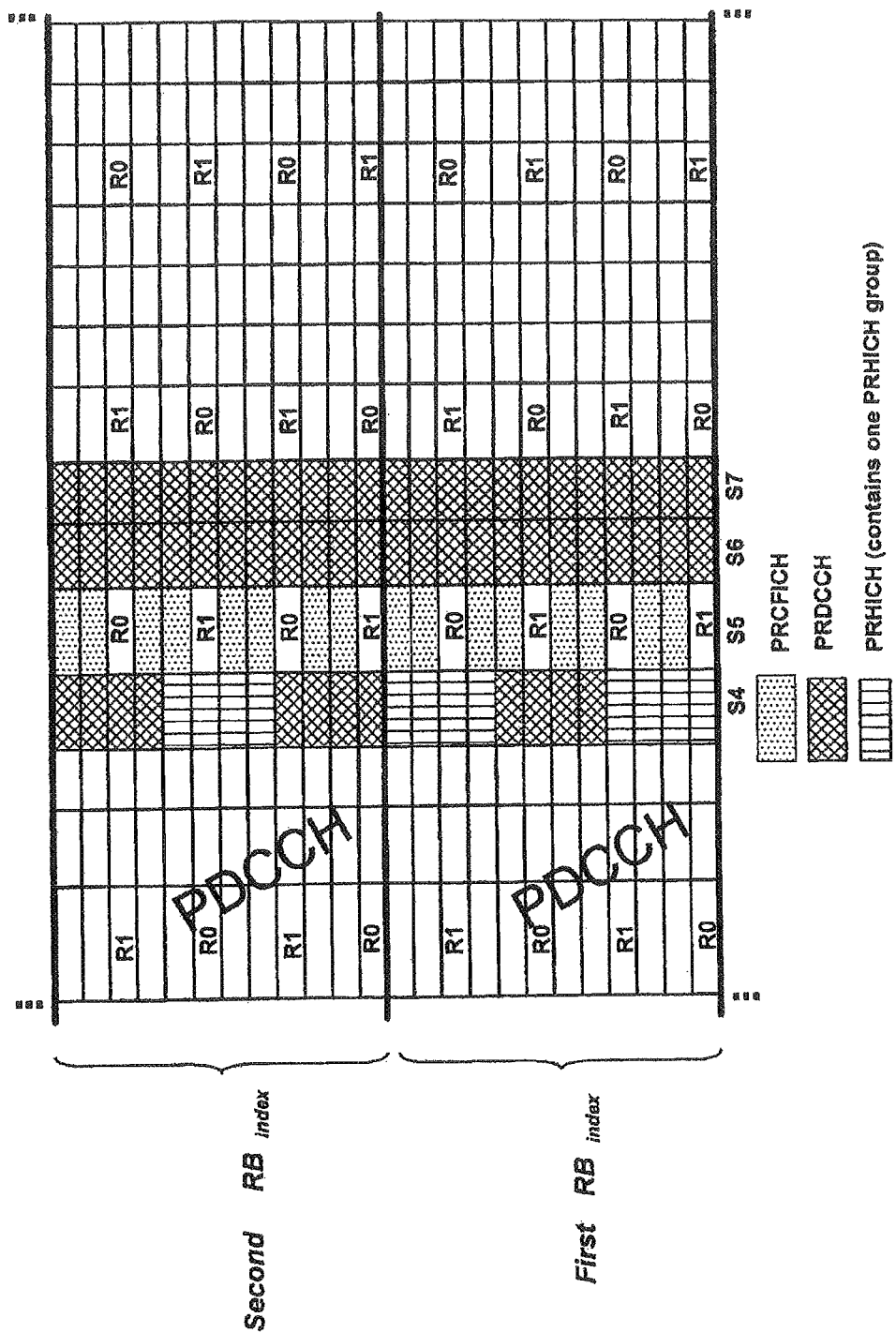
FIG. 5a illustrates the way in which the control data for the relay nodes is distributed over a number of resource blocks within the PDSCH of the donor cell sub-frame, when short cyclic prefixes are used.
Figure 5B:
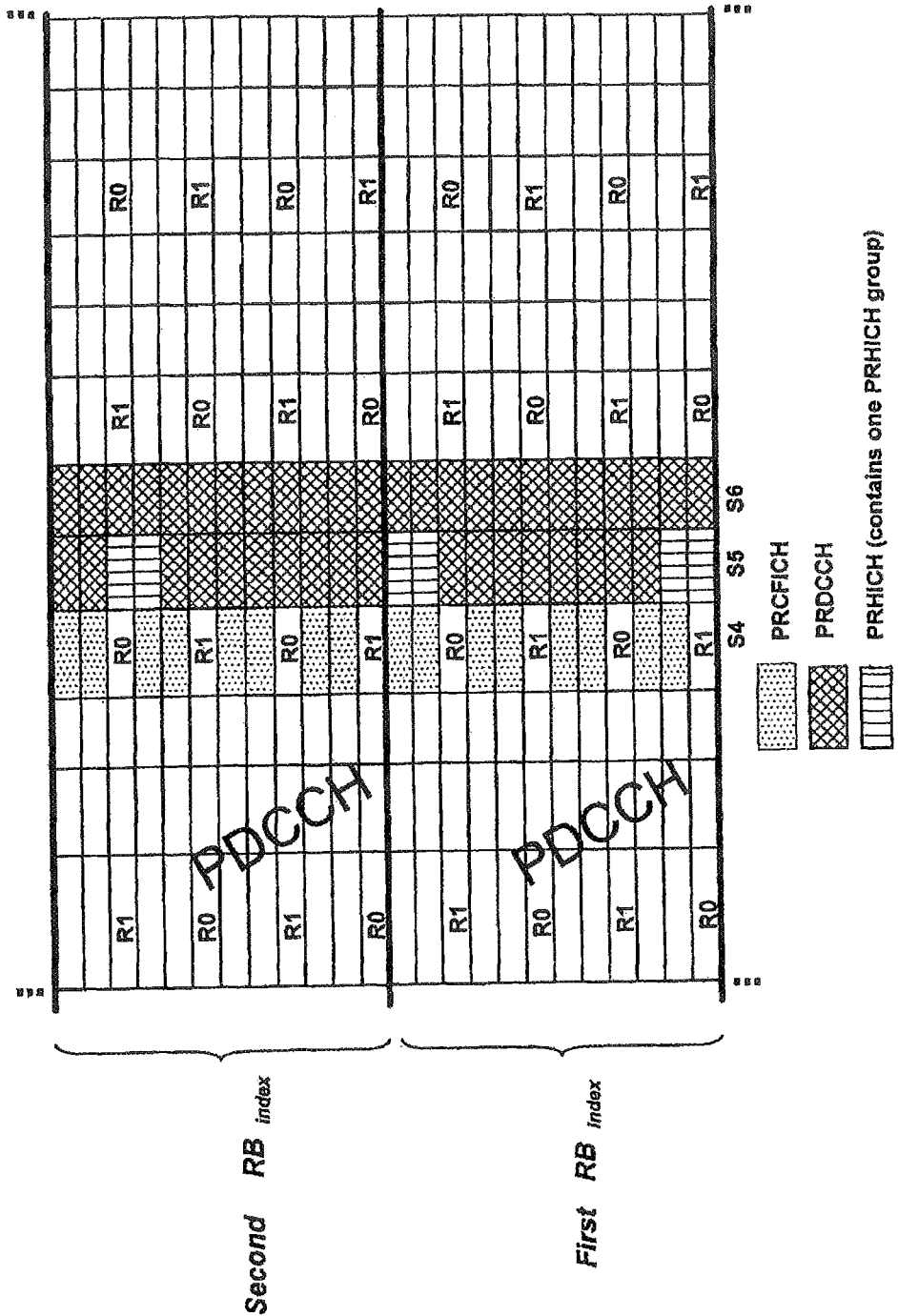
FIG. 5b illustrates the way in which the control data for the relay nodes is distributed over a number of resource blocks within the PDSCH of the donor cell sub-frame, when extended cyclic prefixes are used.

The PRCFICH indicates the size of the PRDCCH channel in terms of the number of resource blocks (RBs) in the frequency domain and is located in the sub-frame 15 at a fixed-known location in terms of number of OFDM symbols in the time domain within the sub-frame. To be precise, in this exemplary embodiment, the PRCFICH carries two bits and applies the same Rel'8 LTE coding scheme resulting in 32 bits or 16QPSK symbols, to provide sufficient coverage to the Relay stations 7 at the cell edge or in case relay stations 7 are used for group mobility. Furthermore; to get good channel estimation and compensation, the PRCFICH is preferably placed on the OFDM symbol which contains some of the reference signals (RS) and is spread over two known resource blocks (RBs) in the frequency domain of the sub-frame. When a nominal cyclic prefix is used, this means placing PRCFICH on the fifth OFDM symbol (as illustrated in FIG. 5a); and when an extended cyclic prefix is used, this means placing PRCFICH on the fourth OFDM symbol (as illustrated in FIG. 5b).

The PRHICH channel (which carries the hybrid-ARQ ACK/NAKs for the relay stations 7) is also transmitted in a fixed-known location in the same two resource blocks (RBs) that carry PRCFICH, see FIGS. 4a and 4b. As the number of relay stations 7 connected to the base station 5 is expected to be small, only a relatively small amount of resources (compared to the resources required for PHICH) need to be allocated for the PRHICH control channel. For example, approximately one or two PHICH groups can be assigned where each PHICH group can carry up to 8 ACK/NAKs simultaneously for normal cyclic prefix sub-frames and up to 4 ACK/NAKs simultaneously for extended cyclic prefix sub-frames.

As mentioned above, the PRCFICH control channel uses two bits to indicate the size of the PRDCCH channel. One way that this can be done for sub-frames with a normal cyclic prefix, is as follows:
00=Relay control resources are 2RBs in the frequency domain and OFDM symbols of S4, S5, S6 and S7 in the time domain. No PRDCCH channel exists in this option only resources for PRCFICH and PRHICH channels. Resources for PRCFICH are 2RBs in the frequency domain and the fifth OFDM symbol (S5) in the time domain. In addition, PRHICH resources are in a fixed-known location in those two resource blocks (RBs).
01=Relay control resources are 3RBs in the frequency domain and OFDM symbols S4, S5, S6 and S7 in the time domain. The PRDCCH channel is present with size of 2CCEs (control channel elements) in total.
10=Relay control resources are 8RBs in the frequency domain and the same OFDM symbols of S4, S5, S6 and S7 in the time domain. The size of the resources for the PRDCCH channel is 8CCEs in total.
11=Relay control resources are 14RBs in the frequency domain and the same OFDM symbols of S4, S5, S6 and S7 in the time domain. The size of the resources for the PRDCCH channel is 16CCEs in total.

One way that this can be done for sub-frames with an extended cyclic prefix, is as follows:
00=Relay control resources are 2RBs in the frequency domain and OFDM symbols S4, S5 and S6 in the time domain. No PRDCCH channel exists in this option only resources for PRCFICH and PRHICH channels. Resources for PRCFICH are 2RBs in the frequency domain and the fifth OFDM symbol (S5) in the time domain. In addition, PRHICH resources are in a fixed-known location in those two resource blocks (RBs).
01=Relay control resources are 3RBs in the frequency domain and OFDM symbols S4, S5 and S6 in the time domain. The PRDCCH channel is present with size of 2CCEs in total.
10=Relay control resources are 10RBs in the frequency domain and the same OFDM symbols of S4, S5 and S6 in the time domain. The size of the resources for the PRDCCH channel is 8CCEs in total.
11=Relay control resources are of 20RBs in the frequency domain and the same OFDM symbols of S4, S5 and S6 in the time domain. The size of the resources for the PRDCCH channel is 16CCEs in total.

The CCEs are coded so that only the intended recipient relay station 7 of the CCE can decode the CCE and recover the control data. Therefore, the maximum number of CCEs that can be allocated in a sub-frame defines how many relay stations 7 can be simultaneously scheduled in the radio cell. Upon receiving the sub-frame 15, all of the relay stations 7 will attempt to decode each of the CCEs to determine if the sub-frame contains data for the relay station 7. As there are not so many CCEs in the sub-frame 15, the search space is not so large and it is thus better to have just one common search space for all the relay stations in the cell, rather than a dedicated control channel for each relay station 7.

Of course, if no relay stations 7 are in a cell, then the PRCFICH and PRHICH channels can be switched off and all the mobile telephones 3 can then be scheduled normally in all the resource blocks in the system.

As mentioned above, in this exemplary embodiment two default resource blocks are used to carry PRCFICH, PRHICH and PRDCCH. The relay stations 7 and the base station 5 will be programmed in advance with data identifying these two default resource blocks. In order to minimise interference and to provide frequency diversity between neighbouring cells, the two default resource blocks are preferably different in neighbouring cells. As will be explained below, this diversity is provided in this exemplary embodiment by using the base station's cell ID to define the two default resource blocks. In this exemplary embodiment, if additional resource blocks are used by the base station 5, then the relay station 7 uses a predefined relationship to work out the location of the additional resource blocks. In this exemplary embodiment, the relay stations 7 use the following equation to determine the location of the resource blocks that are used for the relay control channels:

$$RB_{index}(i) = (N_{ID}^{Cell} \mod N_{RB\_max}^{Alloc} \rfloor + (i \mod 2)* \lceil N_{RB}^{DL}/2 \rceil) \mod N_{RB}^{DL};$$

Where:

$i=0, 1,$ to $N_{RB\_max}^{Alloc}-1$ and the indices of the two default RBs are $i=0$ and $1$ $N_{ID}^{Cell}$ is the cell ID to provide interference randomisation relating to the neighbouring cells $N_{RB}^{DL}$ is the downlink system bandwidth in terms of the number of resource blocks (RBs)

$N_{RB\_max}^{Alloc}$ is the total number of RBs that will be allocated for the control channels (defined by PRCFICH)

$\lfloor \ \rfloor$ is the floor function defining the smallest integer not greater than the expression inside the brackets $\lceil \ \rceil$ is the ceiling function defining the smallest integer not less than the expression inside the brackets.

Thus using this equation will result in the resource blocks that are used for relay control data being distributed in the frequency domain over the available system bandwidth. However, if the base station 5 uses a Distributed Virtual Resource Block (DVRB) allocation method for allocating resources for Direct MTs 3, then using this method may result in the same resource block being allocated for both relay control data and for data destined for a mobile telephone 3. For that reason and to provide a simple integrated solution, an alternative to the above equation is to allocate the relay control resources using the DVRB allocation method. As already specified in LTE Rel'8, the DVRB allocation method just needs the starting virtual resource block and the length in terms of the number of Virtual Resource Blocks (VRBs) allocated for a given device. So, for the relay control resources, the length of the default resource blocks used for PRCFICH and PRHICH channels are always fixed to two VRBs and the length of the additional PRDCCH resources will be given by the PRCFICH channel. So, the only thing that needs to be specified is the starting virtual resource block. One simple way is to use part of the above equation which has a cell specific shift as follows:

$$VRB_{start} = N_{ID}^{Cell} \mod 6$$

Semi-Static Resource Allocations

In the semi-static resource allocation method, amount of resource blocks allocated for relay control data is fixed within each cell and therefore, the PRCFICH indication is not needed. However, in order to support scalable PRDCCH channels (so that cells with more relay stations can have more resources for signaling the relay control data than cells with fewer relay stations 7), the same values carried by the PRCFICH need to be broadcast within the cell in a semi-static manner. However, this method is not as efficient as the dynamic allocation method described above, as resource blocks will be reserved even if they are not used for PRDCCH channels.

Base Station

Figure 6:
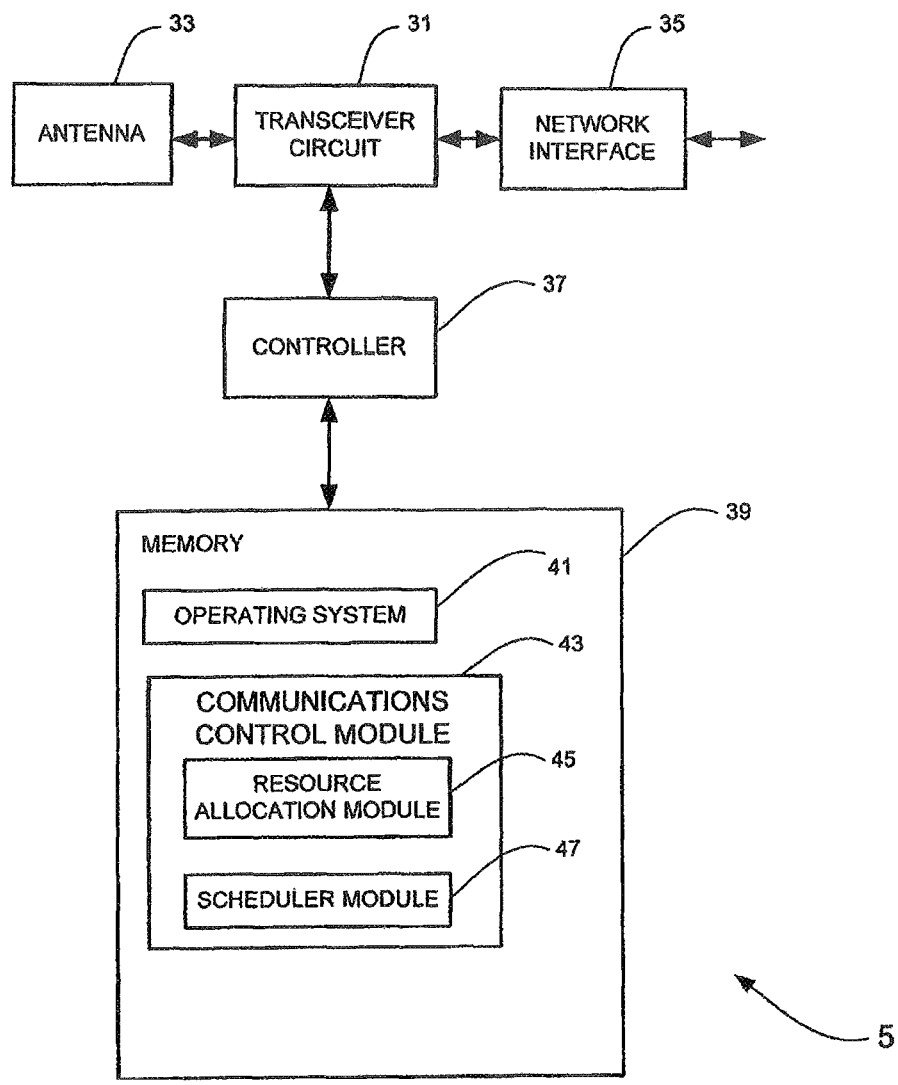
FIG. 6 is a block diagram illustrating the main components of the base station illustrated in FIG. 1.

FIG. 6 is a block diagram illustrating the main components in the base station 5 shown in FIG. 1. As shown, the base station 5 includes a transceiver circuit 31 which is operable to transmit signals to, and to receive signals from, the Direct MTs 3 and the relay stations 7 via one or more antennae 33 (using the above described sub-carriers) and which is operable to transmit signals to and to receive signals from the core network 8 via a network interface 35. The operation of the transceiver circuit 31 is controlled by a controller 37 in accordance with software stored in memory 39. The software includes, among other things, an operating system 41, a communications control module 43 having a resource allocation module 45 and a scheduler module 47. The communications control module is operable to control the generation of the sub-frames for carrying the data to the Direct MTs 3 and the relay stations 7 using the resource allocations module and the scheduler module. The resource allocation module 45 is operable for allocating the resource blocks to be used by the transceiver circuit 31 in its communications with each of the Direct MTs 3 and with the relay stations 7, depending on the amount of data to be transmitted to those devices. The scheduler module 47 is operable to schedule the times for the transmission of the downlink data to the Direct MTs 3 and the relay stations 7.

Relay Station

Figure 7:
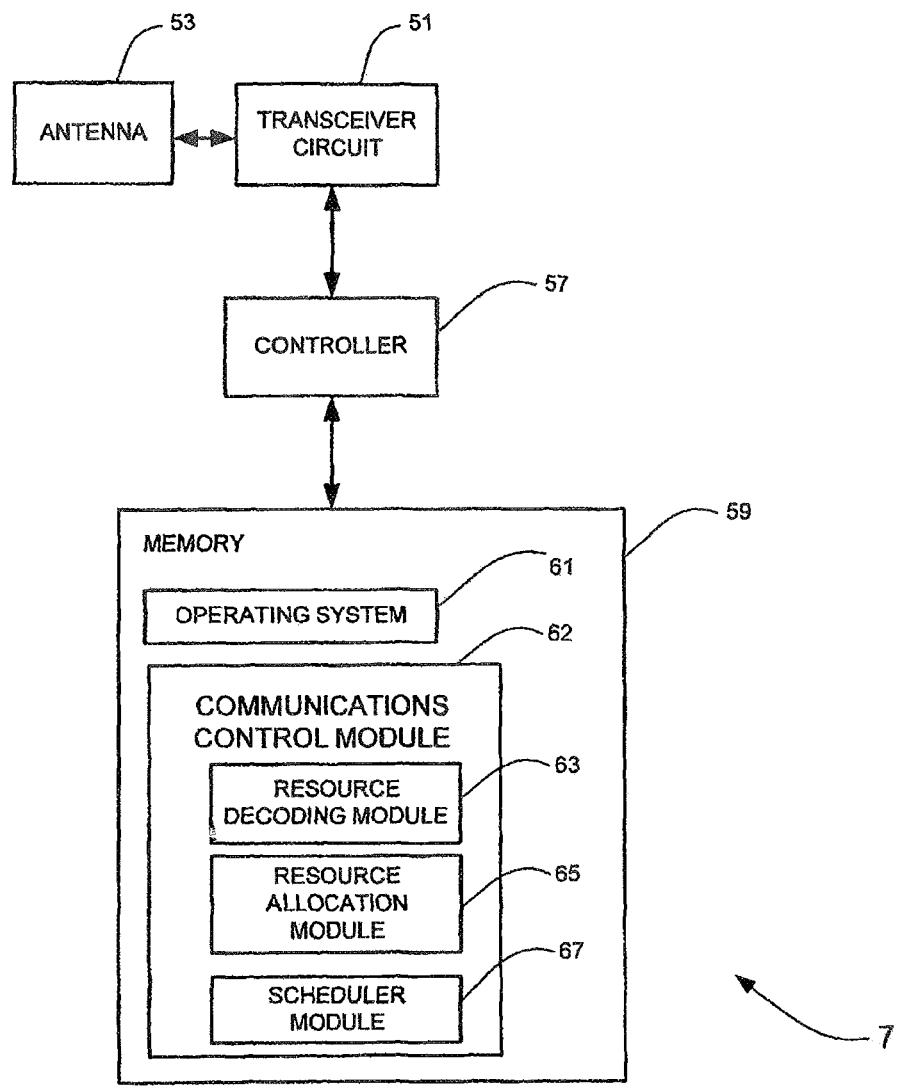
FIG. 7 is a block diagram illustrating the main components of the relay station illustrated in FIG. 1.

FIG. 7 schematically illustrates the main components of each of the relay stations 7 shown in FIG. 1. As shown, each relay station 7 includes a transceiver circuit 51 which is operable to transmit signals to, and to receive signals from, Relay MTs 3 and the base station 5 via one or more antennae 53 (using the above described sub-carriers). The operation of the transceiver circuit 51 is controlled by a controller 57 in accordance with software stored in memory 59. The software includes, among other things, an operating system 61 and a communications control module 62 that includes a resource decoding module 63, a resource allocation module 65 and a scheduler module 67. The communications control module 62 is operable to generate the relay sub-frames 15-R discussed above and to generate the appropriate gaps in some of those sub-frames to allow the relay station to receive part of the sub-frames 15-B transmitted by the base station 5. The communications control module 62 is also operable to control the transceiver circuit 51 to transmit those sub-frames and then to switch the transceiver to a receive mode to receive the base station data (and then to switch the transceiver back to the transmit mode before the start of the next sub-frame). The resource decoding module 63 is operable to process the received portion of the base station sub-frame 15-B to locate and decode PRCFICH and PRHICH from the two default resource blocks; and to determine from PRCFICH if there is more control data on other resource blocks and, if so, to identify those additional resource blocks and to attempt to decode the Control Channel Elements CCEs in those resource blocks in order to determine if the received base station sub-frame 15-B includes "user" data (as opposed to control data) for that relay station 7. If it does, then the resource blocks in which that user data can be found is determined from the decoded CCE and the user data is then recovered from the sub-frame 15-B and stored in memory for use by the relay station 7 or for onward transmission to a Relay MT 3. The resource allocation module 65 is operable for allocating the resource blocks used by the transceiver circuit 51 in its communications with each of the Relay MTs 3 and with the base station 5, depending on the amount of data to be transmitted to those devices. The scheduler module 67 is operable to schedule the times for the transmission of appropriate sub-frames to relay the appropriate data to the Relay MTs 3.

In the above description, the base station 5 and the relay stations 7 are described, for ease of understanding, as having a number of discrete modules (such as the communications control, resource allocation and scheduler modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Modifications and Alternatives

A number of detailed exemplary embodiments have been described above. As those skilled in the art will appreciate, a number of modifications and alternatives can be made to the above exemplary embodiments whilst still benefiting from the inventions embodied therein.

In the above exemplary embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc. As those skilled in the art will appreciate, it is not essential that the above described relay system be used for mobile communications devices. The system can be used to extend the coverage of base stations in a network having one or more fixed computing devices as well as or instead of the mobile communicating devices.

In the above exemplary embodiments, MBSFN sub-frames were used for relay purposes. As those skilled in the art will appreciate, this is not essential and as other types of sub-frames may be used.

In the above exemplary embodiments, the relay station received data from the base station and relayed it to the Relay MTs. As those skilled in the art will appreciate, the relay station may relay the received data to one or more other relay stations, before the data reaches its destination. In this case, the first relay station would generate a sub-frame that included relay control data in the user data part of the sub-frame so that the subsequent relay station can recover the relay control data in a similar manner to that described above.

In the exemplary embodiments described above, the mobile telephone, the relay station and the base station will each include transceiver circuitry. Typically this circuitry will be formed by dedicated hardware circuits. However, in some exemplary embodiments, part of the transceiver circuitry may be implemented as software run by the corresponding controller.

In the above exemplary embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1 INTRODUCTION

As inband-Relay can not transmit and receive at the same time due to self-interference, therefore, MBSFN sub-frame structure was agreed [1]. This MBSFN sub-frame introduces some design restrictions to the relay control structure as relay can not read the PDCCH channel of the donor eNB, hence a new control channel must be designed solely for the Relay nodes.

In this contribution, we provide details of the MBSFN sub-frame and control structure for Relay Type 1 nodes in LTE-Advanced system.

2 MBSFN FRAME STRUCTURE FOR RELAYING

MBSFN sub-frames were already defined in LTE Rel'8 for multicast channels. As proposed in [2], for the sake of backward compatibility, these existing MBSFN sub-frames can be re-used to support relaying in the access link. Based on LTE Rel'8 structure, sub-frames 0, 4, 5, 9 in FDD and 0, 1, 5, 6 in TDD can not be used for MBSFN sub-frames. Therefore, some or all of the remaining sub-frames can be signalled as an MBSFN sub-frames.

Figure 8:
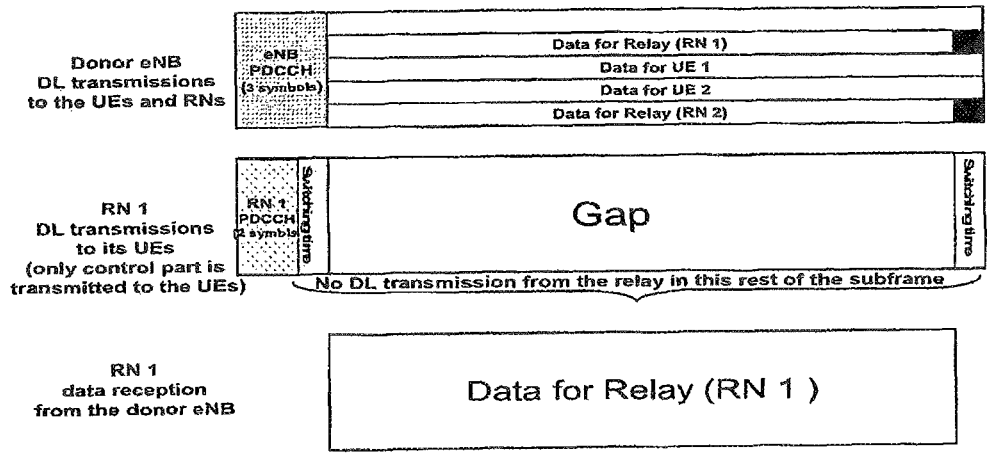
FIG. 8 is for describing eNodeB-to-Relays and UEs communications using MBSFN sub-frames (Top), Relay-to-UEs communications (Middle) and Relay receiving data from the eNB (Bottom)

In the access link, during the MBSFN sub-frame transmission, Relay UEs will receive the first two OFDM symbols of the sub-frame containing control information (RN's PDCCH). In the rest of the sub-frame as shown in FIG. 8, Relay will switch to listen and receive data from the donor eNB in the backhaul link During the rest of the sub-frame, Relay UEs will go to sleep in the access link.

Figure 9:
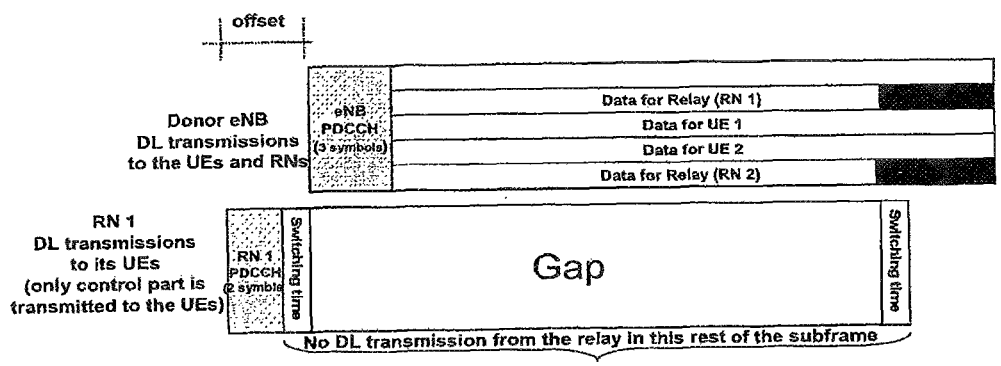
FIG. 9 is for describing offset between eNB and Relay sub-frames (asynchronous transmissions)

From the above structure, it is clear that if eNB and RN are synchronous, Relay can not access eNB's PDCCH transmission, because in the same time period, Relay has to transmit PDCCH to its UEs in the access link. So, a mechanism to handle the Relay control structure needs to be designed. Currently, there are two alternatives for the design of the control for the relays in LTE-A:

Alternative 1: Create offset between eNB and Relay sub-frames so that Relay can read eNB's PDCCH (asynchronous transmissions) [2]. This offset is about three OFDM symbols as shown on FIG. 9 below.
Pros:
Relay monitors existing PDCCH from the donor eNB, i.e. no need to design new separate control region for the relays.
Cons:
The offset creates problem in the UL transmission timings and the choice is one of the followings:
a) The relay node should blank some of its own OFDM symbols or
b) The relay node should ignore some of the last OFDM symbols transmitted by the UEs.

Figure 10:
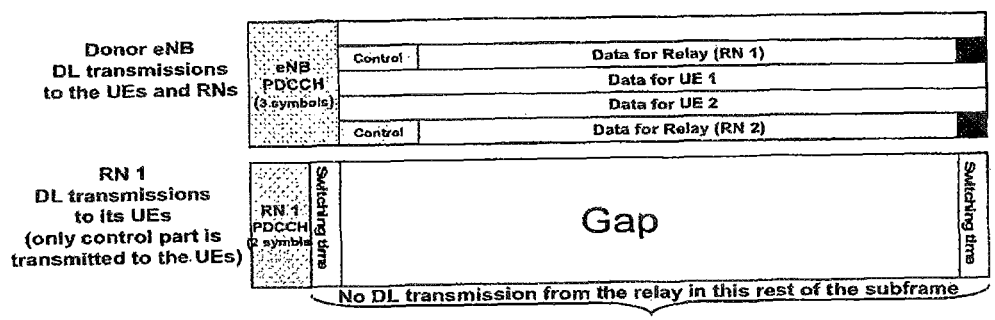
FIG. 10 is for describing new Relay control channels within the PDSCH areas (synchronous transmissions).

Alternative 2: Design new Relay control channels such as PRCFICH, PRDCCH and PRHICH within the PDSCH areas (synchronous transmissions) [3] as shown on FIG. 10 below.

Pros:

eNB and Relays are synchronous

Cons:

New control channels need to be designed.

Some scheduling restrictions for LTE and LTE-A UEs.

3 CONTROL STRUCTURE FOR RELAYING BASED ON ALTERNATIVE 2

For Alternative 2, there are two possible ways of designing the control channel: dynamic resource allocations and semi-static resource allocations. The details are captured in the next sections.

3.1 Dynamic Resource Allocations

In the dynamic resource allocations, PRCFICH indicates the size of the PRDCCH channel in terms of number of resource blocks (RBs) in frequency domain and with a fixed-known location in terms of number of OFDM symbols in time domain within the sub-frame. To be precise, PRCFICH carries two bits and applies same Rel'8 LTE coding scheme resulting 32 bits or 16QPSK symbols to provide sufficient coverage to the Relay nodes at the cell edge or in case Relay nodes are used for group mobility. Further more; to get good channel estimation and compensation, the PRCFICH is preferred to be placed on the fifth OFDM symbol which contains reference signals (RS) and spread over two resource blocks (RBs) in frequency domain within the sub-frame as shown on FIG. 4 for nominal cyclic prefix sub-frames. FIG. 5 on the Appendix also shows for extended cyclic prefix sub-frames.

In addition, PRHICH channel which carries the hybrid-ARQ ACK/NAKs is also transmitted in a fixed-known location in the two resource blocks (RBs), see FIGS. 4 and 5. As the number of Relays connected to the eNB are expected to be not that much large, the PRHICH resources can be made smaller, that is roughly one or two PHICH groups where each PRHICH group can carry up to 8/4 ACK/NAKs simultaneously for normal and extended cyclic prefix sub-frames respectively.

As mentioned above, PRCFICH indicates the size of the PRDCCH channel and it can be interpreted as follows for sub-frames with nominal cyclic prefix:

- 00=Relay control resources are 2RBs in frequency domain and OFDM symbols of S4, S5, S6 and S7 in time domain. PRDCCH channel do not exist in this option, only resources for PRCFICH and PRHICH channels do exist. Resources for PRCFICH are 2RBs in frequency domain and fifth OFDM symbol (S5) in time domain. In addition, PRHICH resources are in a fixed-known location in the two resource blocks (RBs).
- 01=Relay control resources are 3RBs in frequency domain and OFDM symbols S4, S5, S6 and S7 in time domain. But, the PRDCCH channel is present with size of 2CCEs in total.
- 10=Relay control resources are of 8RBs in frequency domain and same OFDM symbols of S4, S5, S6 and S7 in time domain. The size of the resources for PRDCCH channel is 8CCEs in total.
- 11=Relay control resources are of 14RBs in frequency domain and same OFDM symbols of S4, S5, S6 and S7 in time domain. The size of the resources for PRDCCH channel is 16CCEs in total.

The location of PRCFICH, PRHICH and PRDCCH in normal cyclic prefix sub-frame is shown in FIG. 5a.

The maximum number of CCEs allocated depends on how many Relay nodes can be simultaneously scheduled in a sub-frame per cell which needs to be further investigated.

For Relay control search space, it is better to have just one common search space for all the connected Relay nodes as the number of CCEs is not too many anyway. This means that each relay has to scan through all the CCEs to check if it is scheduled at this sub-frame. When there is Relay nodes in the cell then the RBs used for Relay control channels are not used for LTE or LTE-A PDSCH transmission, hence introducing some scheduling restrictions on the eNB scheduler.

Further more, when there are no Relay nodes in the cell then PRCFICH/PRHICH channels are switched off and all UEs can then be scheduled normally in all RBs in the system.

The location of the resource blocks used for Relay control channels can be determined by using the following equation:

$$RB_{index}(i) = (N_{ID}^{Cell} \bmod N_{RB\_max}^{Alloc}] + (i \bmod 2)*[N_{RB}^{DL}/2]) \bmod N_{RB}^{DL};$$

Where:

$i = 0, 1,$ to $N_{RB\_max}^{Alloc} - 1$ and the indices of the two default RBs are $i=0$ and $1$.

$N_{ID}^{Cell}$ the cell ID to provide interference randomization relating to the neighboring cells.

$N_{RB}^{DL}$ is the downlink system bandwidth in tetras of number of resource blocks (RBs).

$N_{RB\_max}^{Alloc}$ is the total number of RBs that will be allocated for the control channels.

When distributed transmission (DVRB) is configured within the component carrier, there could be a collision between the RBs given by the above equation and DVRB resources within the cell. For that reason to provide a simple integrated solution, an alternative to the above equation is to allocate the Relay control resources within the distributed resource blocks. As already specified in LTE Rel'8, the distributed resource signaling just needs the starting virtual resource block and the length in terms of number of VRBs allocated for a given user. So, for the Relay control resources, the length of the default resource blocks used for PRCFICH and PRHICH channels are always fixed to two VRBs and the length of the additional PRDCCH resources will be given by the PRCFICH channel. So, the only thing that needs to be specified is the starting virtual resource block. One simple way is to use part of the above equation which has cell specific shift as the reference signals as follows:

$$VRB_{start} = N_{ID}^{Cell} \bmod 6;$$

3.2 Semi-Static Resource Allocations

In the semi-static resource allocations, PRCFICH indication is not needed. However, in order to support scalable PRDCCH channels, the same values carried by the PRCFICH are needed to be broadcasted within the cell in semi-static manner.

This method is not efficient as the resource blocks are reserved even if they are not used for PRDCCH channels.

4 CONCLUSION

In this contribution, we have provided details of the MB SFN sub-frame and control structure for Relay Type 1 nodes. The following two alternatives for the relay control structure were discussed:

Alternative 1: Create offset between eNB and Relay sub-frames so that Relay can read eNB's PDCCH.

Alternative 2: Design new Relay control channels of PRCFICH, PRDCCH and PRHICH within the PDSCH transmission.

5 REFERENCES 1) 3GPP TR 36.814 V1.0.0
2) R1-084054, "Support of Rel-8 UEs by LTE-A relays", Qualcomm Europe.
3) R1-090153, "Control Channel and Data Channel Design for Relay Link in LTE-Advanced", Nortel Networks
4) R1-090331, "Frame Structure and Signaling to Support Relay Operation", Motorola.
5) R1-090877, "Specification Impact of L3 Relays", Qualcomm Europe.

6 APPENDIX: PRCFICH, PRHICH AND PRDCCH CHANNELS FOR EXTENDED CP LENGTH

The location of PRCFICH, PRHICH and PRDCCH in the extended cyclic prefix sub-frame is shown in FIG. 5*b*.

For sub-frames with extended cyclic prefix, the PRCFICH indicates the size of the PRDCCH channel and it can be interpreted as follows:
- 00=Relay control resources are 2RBs in frequency domain and OFDM symbols of S4, S5 and S6 in time domain. PRDCCH channel do not exist in this option, only resources for PRCFICH and PRHICH channels do exist. Resources for PRCFICH are 2RBs in frequency domain and fifth OFDM symbol (S5) in time domain. In addition, PRHICH resources are in a fixed-known location in the two resource blocks (RBs).
- 01=Relay control resources are 3RBs in frequency domain and OFDM symbols S4, S5 and S6 in time domain. But, the PRDCCH channel is present with size of 2CCE in total.
- 10=Relay control resources are of 10RBs in frequency domain and same OFDM symbols of S4, S5 and S6 in time domain. The size of the resources for PRDCCH channel is 8CCEs in total.
- 11=Relay control resources are of 20RBs in frequency domain and same OFDM symbols of S4, S5 and S6 in time domain. The size of the resources for PRDCCH channel is 16CCEs in total.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from United Kingdom Patent application No. 0907083.0, filed on Apr. 24, 2009, the disclosure of which is incorporated herein in its entirety by reference.

What is claimed is:

1. A method in a relay node, the method comprising:
communicating with a base station;
detecting a relay physical downlink control channel intended for the relay node in a subframe,
determining a relay physical control channel assignment based on a resource block number configured based on a numeric value representing a number of resource blocks in a set of resource blocks configured for the relay physical downlink control channel transmission; and
decoding a corresponding physical downlink shared channel (PDSCH) in the same subframe.

2. A relay node, comprising:
a transceiver; and
a controller operable to:
control the transceiver to communicate with a base station;
detect a relay physical downlink control channel intended for the relay node in a subframe;
determine a relay physical control channel assignment based on a resource block number configured based on a numeric value representing a number of resource blocks in a set of resource blocks configured for the relay physical downlink control channel transmission; and
decode a corresponding physical downlink shared channel (PDSCH) in the same subframe.

* * * * *

UNITED STATES PATENT AND TRADEMARK OFFICE
CERTIFICATE OF CORRECTION

PATENT NO. : 10,750,428 B2  
APPLICATION NO. : 15/293763  
DATED : August 18, 2020  
INVENTOR(S) : Yassin Aden Awad Page 1 of 1

It is certified that error appears in the above-identified patent and that said Letters Patent is hereby corrected as shown below:

In the Specification

Column 1, Background Art, Line 48; After "link", insert --.--

Column 5, Best Mode for Carrying out the Invention, Line 55; Delete "NBW" and insert --$N_{BW}$-- therefor Column 6, Best Mode for Carrying out the Invention, Line 10; Delete "MB SFN" and insert --MBSFN-- therefor Column 7, Best Mode for Carrying out the Invention, Line 4; Delete "MB SFN" and insert --MBSFN-- therefor Column 7, Best Mode for Carrying out the Invention, Line 50; Delete "nominal" and insert --normal-- therefor Column 12, Best Mode for Carrying out the Invention, Line 44; After "link", insert --.--

Column 13, Best Mode for Carrying out the Invention, Line 33; Delete "nominal" and insert --normal-- therefor Column 13, Best Mode for Carrying out the Invention, Line 47; Delete "nominal" and insert --normal-- therefor Column 14, Best Mode for Carrying out the Invention, Line 10; After "sub-frame.", insert --¶--

Column 14, Best Mode for Carrying out the Invention, Lines 64-65; Delete "MB SFN" and insert --MBSFN-- therefor Signed and Sealed this  
Eighth Day of December, 2020

Andrei Iancu  
*Director of the United States Patent and Trademark Office*